(12) United States Patent
Ueno

(10) Patent No.: US 8,285,902 B2
(45) Date of Patent: Oct. 9, 2012

(54) DATA TRANSFER APPARATUS AND DATA TRANSFER METHOD

(75) Inventor: Hirotaka Ueno, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 364 days.

(21) Appl. No.: 12/635,148

(22) Filed: Dec. 10, 2009

(65) Prior Publication Data

US 2010/0161868 A1    Jun. 24, 2010

(30) Foreign Application Priority Data

Dec. 24, 2008 (JP) ................. 2008-328821

(51) Int. Cl.
*G06F 13/00* (2006.01)
*G06F 13/42* (2006.01)
*G06F 13/368* (2006.01)

(52) U.S. Cl. ......... 710/107; 710/105; 710/108; 710/119

(58) Field of Classification Search .............. 710/105, 710/107–108, 113–117, 119, 121–124, 309, 710/240–242, 244

See application file for complete search history.

(56) References Cited

U.S. PATENT DOCUMENTS

| | | | |
|---|---|---|---|
| 6,219,697 B1* | 4/2001 | Lawande et al. | 709/221 |
| 6,446,147 B1* | 9/2002 | Dajer et al. | 710/100 |
| 6,529,984 B1* | 3/2003 | Teener et al. | 710/240 |
| 7,853,736 B2* | 12/2010 | Ueno | 710/40 |
| 7,995,606 B1* | 8/2011 | Hauck et al. | 370/462 |
| 2008/0082703 A1 | 4/2008 | Ueno | |

FOREIGN PATENT DOCUMENTS

| | | |
|---|---|---|
| JP | 10-336252 | 12/1998 |
| JP | 2008-85834 | 4/2008 |

OTHER PUBLICATIONS

"IEEE Standard for a High Performance Serial Bus". IEEE Standard 1394-1995. 1996. The Institute of Electrical and Electronics Engineers, Inc.*

"IEEE Standard for a High-Performance Serial Bus—Amendment 2". IEEE Standard 1394b-2002 (Amendment to IEEE Standard 1394-1995). Dec. 14, 2002. The Institute of Electrical and Electronics Engineers, Inc.*

* cited by examiner

*Primary Examiner* — Thomas J Cleary
(74) *Attorney, Agent, or Firm* — Staas & Halsey LLP

(57) ABSTRACT

A data transfer apparatus performing data communication by transmitting a bus use request to an arbiter between a plurality of nodes coupled in a tree shape through a bus is provided. The data transfer apparatus includes a request generation circuit which generates a highest priority request indicating that a priority level for using the bus is the highest, a determination circuit which determines the priority level of the highest priority request, and a priority level setting circuit which determines the highest priority request which takes priority based on a result of the determination circuit when a plurality of highest priority requests conflicts in a node.

15 Claims, 15 Drawing Sheets

FIG. 2

| PRIORITY LEVEL | REQUEST CLASS | DESCRIPTION |
|---|---|---|
| HIGH | Express | EMERGENCY |
| ↑ | BusReset | BUS RESET REQUEST |
| | Immidiate | Acknowledge PACKET TRANSMISSION REQUEST |
| | CycleStart | CSP TRANSMISSION REQUEST |
| | ISO_EVEN | Isochronous PACKET TRANSMISSION REQUEST |
| | ISO_ODD | |
| | PH_CURRENT | Asynchronous PACKET TRANSMISSION REQUEST |
| ↓ | PH_EVEN | |
| LOW | PH_ODD | |

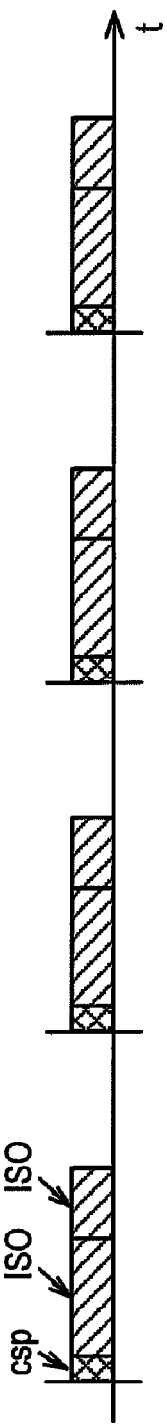
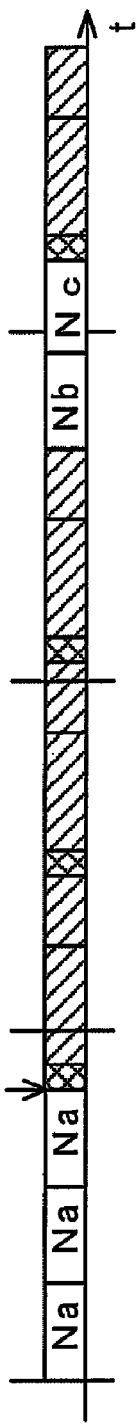
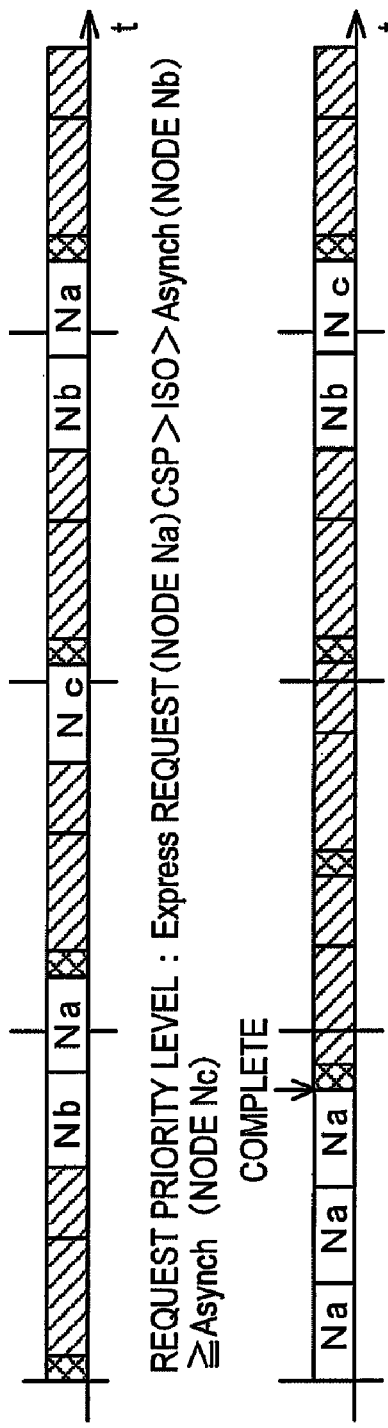
FIG. 7A
FIG. 7B
FIG. 7C

US 8,285,902 B2

DATA TRANSFER APPARATUS AND DATA TRANSFER METHOD

CROSS-REFERENCE TO RELATED APPLICATIONS

This application claims the benefit of priority from Japanese Patent Application No. 2008-328821 filed on Dec. 24, 2008, the entire contents of which are incorporated herein by reference.

BACKGROUND

1. Field

Embodiments discussed herein relate to a data transfer apparatus and data transfer method.

2. Description of Related Art

A personal computer used at home and the like is coupled to various peripheral devices, such as a printer and a digital camera. For example, a serial interface is used for data communication between the personal computer and the peripheral devices. For example, the serial interface includes a communication interface based on the IEEE 1394 standard. IEEE 1394 supports a high transfer speed of 100/200/400/800 Mbps and thus transfers a large amount of data.

The related techniques are disclosed in Japanese Laid-open Patent Publication No. H10-336252, Japanese Laid-open Patent Publication No. 2008-85834

SUMMARY

According to one aspect of the embodiments, a data transfer apparatus performing data communication by transmitting a bus use request to an arbiter between a plurality of nodes coupled in a tree shape through a bus is provided which includes a request generation circuit which generates a highest priority request indicating that a priority level for using the bus is the highest, a determination circuit which determines the priority level of the highest priority request, and a priority level setting circuit which determines the highest priority request which takes priority based on a result of the determination circuit when a plurality of highest priority requests conflicts in a node.

Additional advantages and novel features of the embodiments will be set forth in part in the description that follows, and in part will become more apparent to those skilled in the art upon examination of the following or upon learning by practice of the invention.

BRIEF DESCRIPTION OF THE DRAWINGS

FIG. 2 illustrates an exemplary priority level determination table;
FIGS. 7A, 7B and 7C illustrate an exemplary packet transmission.

DESCRIPTION OF EMBODIMENTS

When performing data communication with other devices, a device sends a transmission permission request to a device coupled to an arbiter to obtain transmission permission for outputting data to a bus. When the transmission permission is obtained from the device coupled to an arbiter, the device performs data communication. When many devices are coupled to the bus, a device may receive a plurality of requests from a plurality of devices at the same time. A priority level is assigned to each request, and transmission permission is granted to a device having the highest priority level.

For example, when obtaining the bus in an emergency, communication may not be started due to priority reasons. A command which instructs to insert an emergent data communication is provided. The priority level is set to the highest by this command.

According to the IEEE 1394b, which is an extended standard of the IEEE 1394, a communication cable coupling the devices together such as a bus cable includes two communication lines for duplex communication. Since the two communication lines are provided, a request command such as a bus request may also be transmitted contemporaneously during data transfer.

Figure 1:
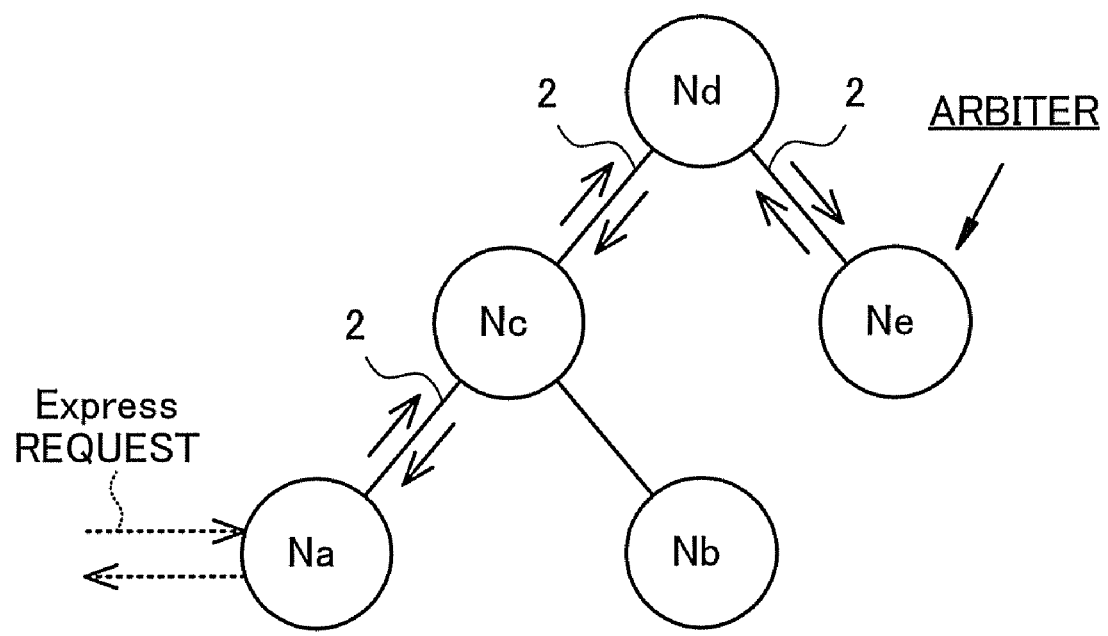
FIG. 1 illustrates a first embodiment.

FIG. 1 illustrates a first embodiment. FIG. 1 illustrates an exemplary network communication system. A network communication system 1 includes a plurality of devices, for example, five devices Na to Ne, as topology network elements. These devices may be called nodes. The nodes Na to Ne include an electronic device such as a personal computer, a printer, a digital camera, and a digital video camera. The nodes Na to Ne are coupled via a bus cable 2 in a shape of a tree such as a daisy-chain, a star, and a tiered star. According to the network communication system illustrated in FIG. 1, a node Nc is coupled to a node Na and a node Nb, and the node Nd is coupled to a node Nc and a node Ne. The nodes Na to Ne perform data communication by packet communication which divides data into several packets and transmits the packets to a communication partner. The bus cable 2 includes a bus path and a bus cable.

Some of the nodes Na to Ne have an arbitration function and some do not have any arbitration function. The arbitration means controlling so as to prevent conflicts of mutual processes when a plurality of nodes operate contemporaneously, for example, perform data communication contemporaneously. The function of executing the arbitration may be called as an arbiter. For example, the node Ne may include an arbiter and the nodes Na to Nd may not include any arbiter.

In a packet communication, in order to establish a bus such as a communication path, a communicating node transmits a request such as a bus request for each packet to the node Ne including an arbiter via the bus cable 2 and acquires transmission permission such as use permission from the node Ne. When the transmission permission is acquired from the node Ne, the communicating node transmits packet data to the bus cable 2 and performs packet communication with a remote node. The communicating node transmits the bus request to the node including the arbiter through other nodes along the communication path. For example, in FIG. 1, the node Na outputs the bus request.

For example, the nodes Na to Ne may perform packet communication in a communication format compliant with the IEEE 1394b standard. The IEEE 1394b standard supports a high transfer speed of 100/200/400/800 Mbps and thus may transmit a large amount of data to the communication partner in a short time period. The IEEE 1394b supports duplex communication. According to the IEEE 1394b, a cable includes two wires. According to the IEEE 1394b, communication data is input and output contemporaneously, and thus, for example, a bus request may be transmitted during data transfer.

FIG. 2 illustrates an exemplary priority level determination table. As illustrated in FIG. 2, a bus request includes a Bus-Reset request which corresponds to a bus reset request, an Immediate request which corresponds to an acknowledge (response) packet transmission request, a CycleStart request which corresponds to a cycle start packet (CSP) transmission request, and the like. The bus request also includes an ISO EVEN request and an ISO ODD request as an isochronous packet transmission request. The bus request further includes a PH CURRENT request, a PH EVEN request, and a PH ODD request as an asynchronous packet transmission request.

According to a communication protocol of the IEEE 1394b, for example, there may not be a host computer controlling the arbitration process. Therefore, a priority level is set to a bus request. For example, the priority level determination table illustrated in FIG. 2 where a request priority level is set to the nodes Na to Ne is registered. Starting with the highest priority, the requests are prioritized in the order of a BusReset request, an Immediate request, a CycleStart request, an ISO EVEN request, an ISO ODD request, a PH CURRENT request, a PH EVEN request, and a PH ODD request.

The Express request, which has the highest priority level of all the bus requests, is set. The Express request forcibly requests a node using the bus cable 2 to release the right to use the bus cable 2. The Express request terminates the communication process of the node performing packet communication via the bus cable 2 and grants transmission permission to the node issuing the Express request so as to allow the Express request issuing node to interrupt the data communication.

Figure 3:
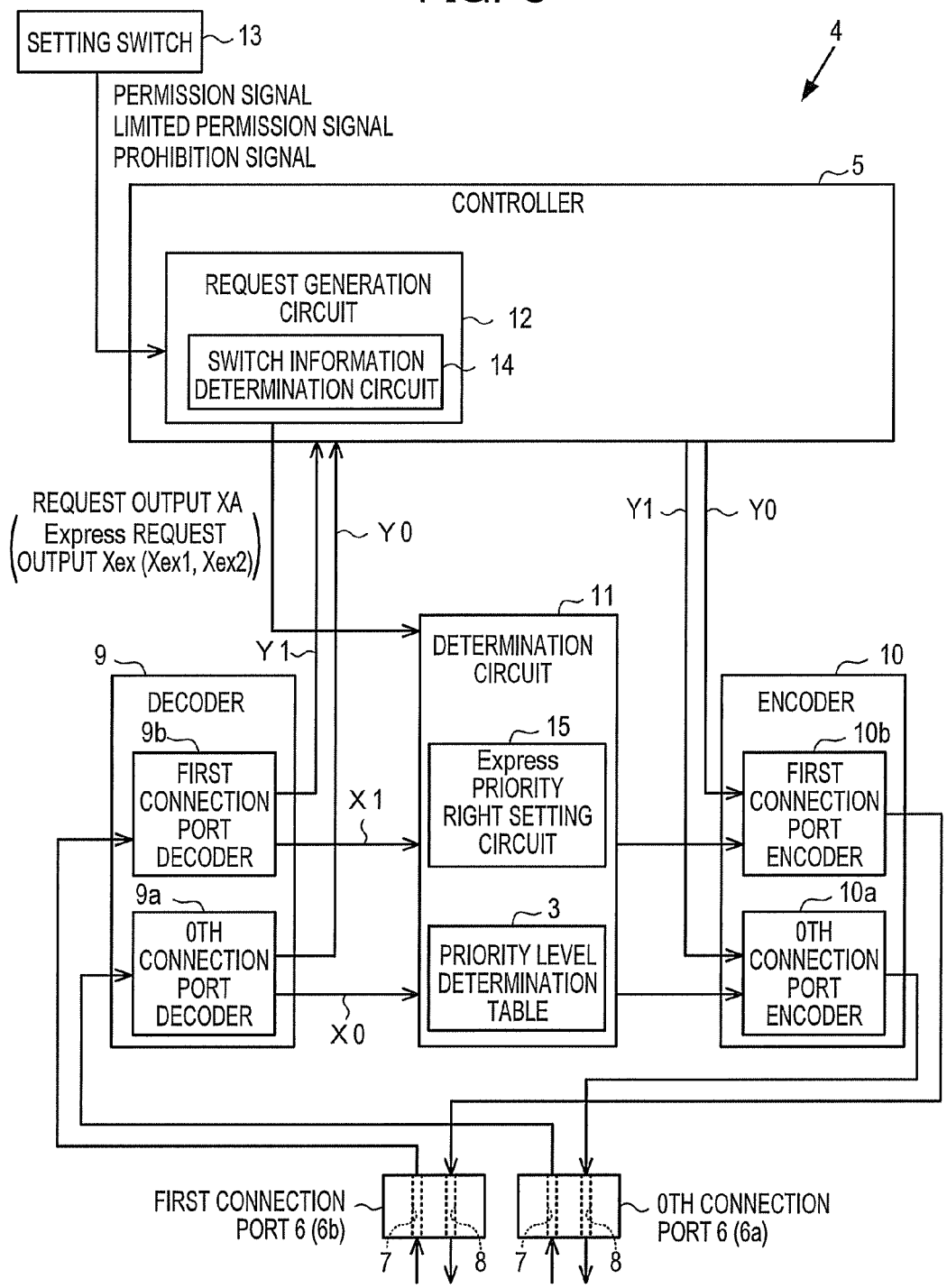
FIG. 3 illustrates an exemplary data transfer apparatus.

FIG. 3 illustrates an exemplary data transfer apparatus. The nodes Na to Ne may include a data transfer apparatus 4 controlling data communication between nodes. The data transfer apparatus 4 includes a controller 5 controlling the data transfer apparatus 4. The controller 5 includes a device element such as a Central Processing Unit (CPU), a Read Only Memory (ROM), and a Random Access Memory (RAM). For example, inter-node packet communication is managed by the data transfer apparatus 4 based on a control program stored in the ROM.

The data transfer apparatus 4 includes a connection port 6 coupling to the bus cable 2. The number of connection ports may be singular or plural. FIG. 3 illustrates two connection ports. Since the connection ports 6 conform to the IEEE 1394b, each include two data paths such as a data input port 7 and a data output port 8. In FIG. 3, one of the two connection ports 6 may be a 0th connection port 6a and the other connection port 6 may be a first connection port 6b.

The data input ports 7 of the connection ports 6a and 6b each include a decoder 9 which restores (decodes) encoded data input from the connection port 6. The decoder 9 includes a 0th connection port decoder 9a, which restores encoded data input from the data input port 7 of the 0th connection port 6a, and a first connection port decoder 9b, which restores encoded data input from the data input port 7 of the first connection port 6b. The 0th connection port decoder 9a restores and outputs the input data input from the data input port 7 of the 0th connection port 6a. The first connection port decoder 9b restores and outputs the input data input from the data input port 7 of the first connection port 6b.

The output side of the controller 5 is coupled to an encoder 10 which codes (encodes) a data sequence transmitted from the controller 5 as transmission data. The encoder 10 includes a 0th connection port encoder 10a coupled to the data output port 8 of the 0th connection port 6a and a first connection port encoder 10b coupled to the data output port 8 of the first connection port 6b. The 0th connection port encoder 10a codes transmission data transferred for the 0th connection port 6a from the controller 5 and outputs the coded data from the data output port 8 of the 0th connection port 6a. The first connection port encoder 10b codes transmission data transferred for the first connection port 6b from the controller 5 and outputs the coded data from the data output port 8 of the first connection port 6b.

The data transfer apparatus 4 includes a determination circuit 11 which determines which request has the highest priority of a plurality of input request commands. The determination circuit 11 includes, for example, a hardware circuit in which a plurality of logic circuits are incorporated, and is coupled to the controller 5, the decoder 9, and the encoder 10. The determination circuit 11 includes a priority level determination table 3 illustrated in FIG. 3 for determining the priority. When a request is input, the priority level determination table 3 is referred to in order to determine which request has the highest priority of a plurality of input requests.

The controller 5 includes a request generation circuit 12 which generates a request corresponding to an operation executed by a local node and outputs the request to the determination circuit 11. The request generation circuit 12 generates the request corresponding to an operation executed by a local node, for example, by referring to the priority level determination table 3 illustrated in FIG. 3 and outputs the generated request to the determination circuit 11 as a 3-bit request output Xa. For example, the Express request is generated as serial data "110", and the BusReset request is generated as serial data "011".

When a request is received from a remote node, the decoder 9 converts a request code in the request into, for example, a 3-bit data sequence in order to match the 3-bit request output X0 generated by the request generation circuit 12, and then outputs the request to the determination circuit 11. The request code of the 0th connection port 6a received by the 0th connection port decoder 9a is converted into the 3-bit request output X0, and the request code of the first connection port 6b received by the first connection port decoder 9b is converted into the 3-bit request output X1. When the request outputs X0 and X1 are input from the connection ports 6a and 6b, respectively, and the request output Xa is input from the request generation circuit 12, the determination circuit 11 refers to the priority level determination table 3 to determine which request has the highest priority of all the request outputs Xa, X0, and X1. Based on the determined priority, the determination circuit 11 performs request delivery via the encoder 9 or issues transmission permission to the remote node and the like.

Figure 4:
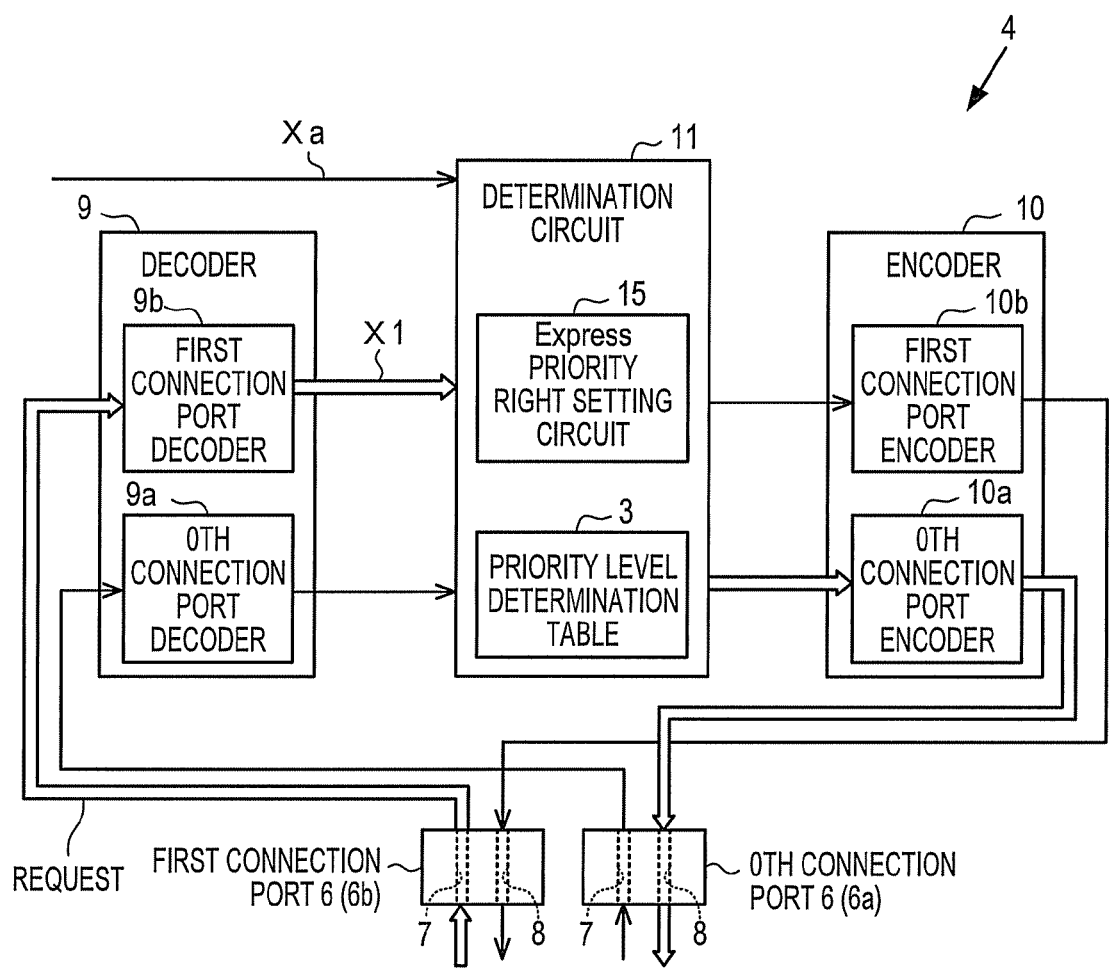
FIG. 4 illustrates an exemplary operation of the data transfer apparatus.

FIG. 4 illustrates an exemplary operation of the data transfer apparatus. For example, when a node not including an arbiter receives a plurality of requests, the node not including an arbiter transfers a request determined to have the highest priority to a node including an arbiter. For example, as illustrated in FIG. 4, the request is transmitted to the node including an arbiter via a connection port coupling to the arbiter, for example, the 0th connection port 6a. The determination circuit 11 selects a request having the high priority from the request outputs Xa and X1, which are received as a node not including an arbiter, and outputs the selected request to the 0th connection port encoder 10a in the arbiter direction. The 0th connection port encoder 10a encodes the highest priority request output and outputs the request from the 0th connection port 6a in the arbiter direction.

Figure 5:
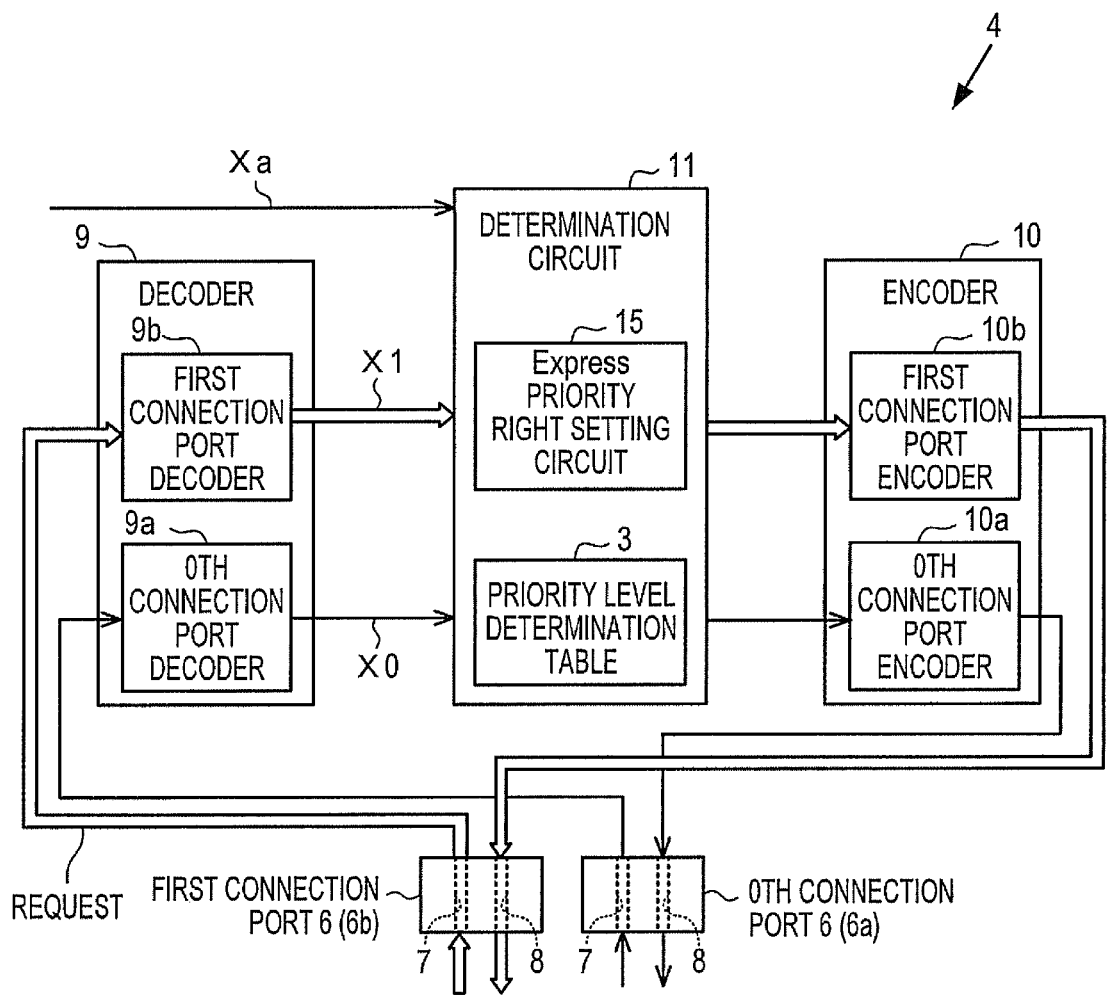
FIG. 5 illustrates an exemplary operation of the data transfer apparatus.

FIG. 5 illustrates an exemplary operation of a data transfer apparatus. When a node including an arbiter receives a plurality of requests, the node including the arbiter outputs transmission permission to the node outputting the highest priority request to allow the node to use the bus cable 2. In order to return the request to the node outputting the request through a path obtained by reversing a path where the request is transmitted, for example, as illustrated in FIG. 5, transmission permission is transmitted toward the node transmitting the highest priority request via a connection port coupled to an input to which the request is input, for example, via the first connection port 6b. The transmission permission may include a transmission permission code such as a function code indicating that the bus cable 2 is allowed to be used.

As illustrated in FIG. 3, when a transmission permission signal is received from a remote node via the connection ports 6a and 6b, the decoder 9 decodes the transmission permission signal and outputs transmission permission outputs Y0 and Y1 to the controller 5. The controller 5 transmits transmission permission to the node outputting the highest priority request. This node may be a local controller or another node. For example, when the transmission permission outputs Y0 and Y1 are addressed to the local node, the transmission permission outputs Y0 and Y1 are not transmitted to the remote node and data transfer is started in the local node. When the transmission permission outputs Y0 and Y1 are addressed to the remote node, the transmission permission outputs Y0 and Y1 are transmitted to the forwarding node.

When the Express request is included in the requests received by the determination circuit 11 and the transmission of the Express request is permitted, the packet communication in an execution state is cancelled. Then, the bus path is released to the node outputting the Express request and data communication for the node outputting the Express request is executed. When the determination circuit 11 confirms the Express request in a plurality of received requests, the determination circuit 11 gives priority to the Express request, discards the other requests, and transfers the Express request to the node including an arbiter. When the Express request is received, the node including an arbiter transmits transmission permission toward the node outputting the Express request, and cancels the other packet communication in execution. The packet communication of the node outputting the Express request is executed with the highest priority.

For example, when the node Na illustrated in FIG. 1 outputs the Express request to the node Ne including an arbiter, the node Nc receives the Express request from the node Na. The node Nc gives priority to the Express request of the node Na and transfers the Express request to the node Nd in the arbiter direction. The node Nd transfers the Express request received from the node Nc to the node Ne. The node Ne including an arbiter recognizes the Express request received from the node Nd and transfers transmission permission to the node Na through the node Nd and the node Nc. Based on the transmission permission received from the node Ne including an arbiter, the node Na occupies the bus cable 2 to start packet communication. The packet communication of the node Na is executed with priority over that of all the other nodes, and thus the node Na may complete the transfer shortly.

Figure 6A:
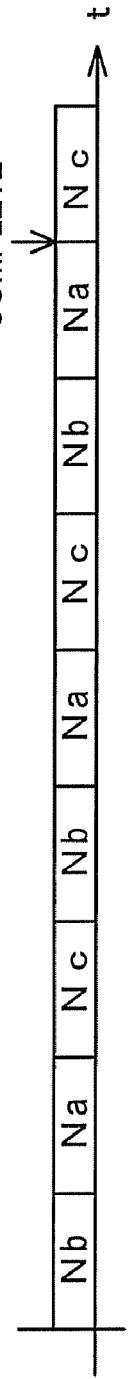
FIGS. 6A and 6B illustrate an exemplary packet transmission.
Figure 6B:
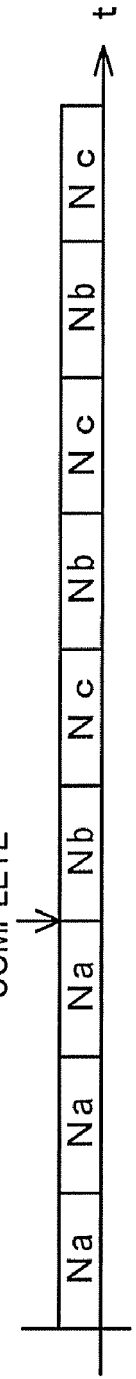

FIGS. 6A and 6B illustrate an exemplary packet transmission. For example, as illustrated in FIG. 6A, the nodes Na to Nc each may output an Asynchronous packet request to transmit three 2-Kbyte packets. The priority between the nodes Na to Nc may be as follows. Asynchronous (node Nb)≧Asynchronous (node Na)≧Asynchronous (node Nc). For example, when the node Na, which wants to shorten communication response, does not output the Express request, since the bus cable 2 is used by the three nodes Na to Nc, the node Na may take time to complete the transfer. If the node Na outputs the Express request, for example, as illustrated in FIG. 6B, the packet communication of the node Na is executed with priority over the nodes Nb and Nc, and thus the node Na may complete the transfer shortly.

FIGS. 7A, 7B and 7C illustrate an exemplary packet transmission. For example, as illustrated in FIG. 7A, when streaming transfer such as video data is performed, the nodes Na to Nc each may transmit an Asynchronous packet request to transmit three 2-Kbyte packets. The priority between the nodes Na to Nc may be as follows. CSP>Isochronous>Asynchronous (node Nb)≧Asynchronous (node Na)≧Asynchronous (node Nc). For example, when the node Na, which wants to shorten communication time, does not output the Express request, since, as illustrated in FIG. 7B, the available packet communication band is narrow and three nodes Na to Nc perform transmission, the node Na may take time to complete the transfer. If the node Na outputs the Express request, for example, as illustrated in FIG. 7C, the packet communication of the node Na is executed with priority over the other nodes, and the node Na may complete the transfer shortly.

Figure 8A:
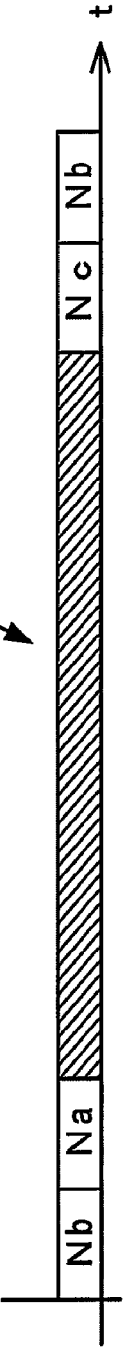
FIGS. 8A and 8B illustrate an exemplary packet transmission.
Figure 8B:
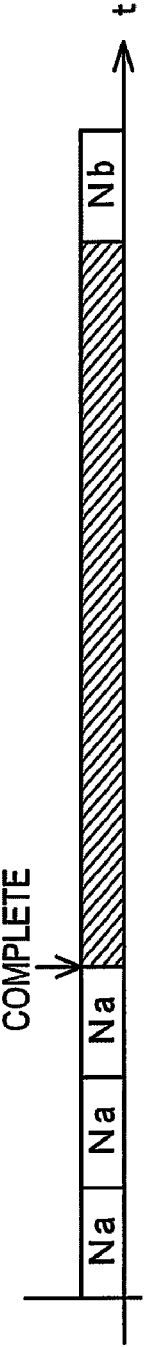

FIGS. 8A and 8B illustrate an exemplary packet transmission. For example, as illustrated in FIG. 8A, when the nodes Na to Nc each may output an Asynchronous packet request to transmit three 2-Kbyte packets, a bus reset occurs. The priority between the nodes Na to Nc may be as follows. BusReset>Asynchronous (node Nb)≧Asynchronous (node Na)≧Asynchronous (node Nc). For example, when the node Na, which wants to shorten communication time and does not output the Express request, since the communication of the node Na is restarted after the bus reset is completed, the node Na may take time to complete the transfer. If the node Na outputs the Express request, for example, as illustrated in FIG. 8C, the communication of the node Na is executed with priority over the bus reset, and thus the node Na may complete the transfer shortly.

According to the data transfer apparatus 4, for example, the determination circuit 11 receives a plurality of Express requests. For example, when the request generation circuit 12 of the local node issues the Express request, a setting switch 13 illustrated in FIG. 3 selects one of the permission, limited permission, and prohibition. The Express request permission of the local node means that the Express request generated in the local node takes priority. The Express request limited permission of the local node means that the Express request from the remote node takes priority. The Express request prohibition of the local node means that the request generation circuit 12 of the local node is prohibited from issuing the Express request.

The setting switch 13 includes a hardware switch such as a mechanical switch and may be set by a network designer of the network communication system 1. For example, when the node is powered on, the setting switch 13 outputs a switch signal according to its own switch state to the request generation circuit 12. For example, the setting switch 13 outputs a permission signal indicating that the Express request of the local node takes priority, a limited permission signal indicating that the Express request of the remote node takes priority, or a prohibition signal indicating that the local node is prohibited from issuing the Express request.

The request generation circuit 12 includes a switch information determination circuit 14 which sets the priority level of an Express request based on a switch signal from the setting switch 13. The switch information determination circuit 14 is generated by the CPU or the control program of the controller 5. The switch information determination circuit 14 combines the instruction based on the switch signal received from the setting switch 13 into the local node Express request command Xex (may be referred to as Express request output) and outputs it to the determination circuit 11. The Express request output Xex includes several bits corresponding to an Express request command, for example, 3-bit command information, and instruction information indicating an instruction based on the switch signal. The switch information determination circuit 14 may set a priority level.

When the permission signal is received from the setting switch 13, the switch information determination circuit 14 outputs the local Express priority request output Xex1 including the local Express request priority instruction which gives the highest priority to the local node Express request to the determination circuit 11. When an Express request command is received from the local node and the remote node, the determination circuit 11 operates based on the local Express request priority instruction in the local node request output Xex1 and gives priority to the local node Express request. The determination circuit 11 assigns the priority right to the local node Express request based on the local Express request priority instruction.

When the limited permission signal is received from the setting switch 13, the switch information determination circuit 14 outputs the remote Express priority request output Xex2 including the remote Express request priority instruction which gives the highest priority to the remote node to the determination circuit 11. When an Express request command is received from the local node and the remote node, the determination circuit 11 operates based on the remote Express request priority instruction in the local node request output Xex2, and the remote node Express request fetched from the connection ports 6a and 6b takes priority. The priority right is assigned to the remote node Express request based on the remote Express request priority instruction.

When the prohibition signal is received from the setting switch 13, the switch information determination circuit 14 stops outputting the Express request output Xex to prohibit the local node request generation circuit 12 from issuing the Express request. The determination circuit 11 does not receive any Express request command from the local node request generation circuit 12. In the prohibition state, a remote node Express request input from the connection ports 6a and 6b takes priority.

The determination circuit 11 may include an Express priority right setting circuit 15 which sets a priority level to each of the plurality of Express requests based on the Express request output Xex from the request generation circuit 12 when the plurality of Express requests are input contemporaneously. When a local node Express request and a remote node Express request are input to the determination circuit 11, the Express priority right setting circuit 15 refers to an instruction included in the local node Express request output Xex, for example, a local Express request priority instruction and a remote Express request priority instruction, to set which Express request to take priority. The Express priority right setting circuit 15 may set the priority level.

Figure 9:
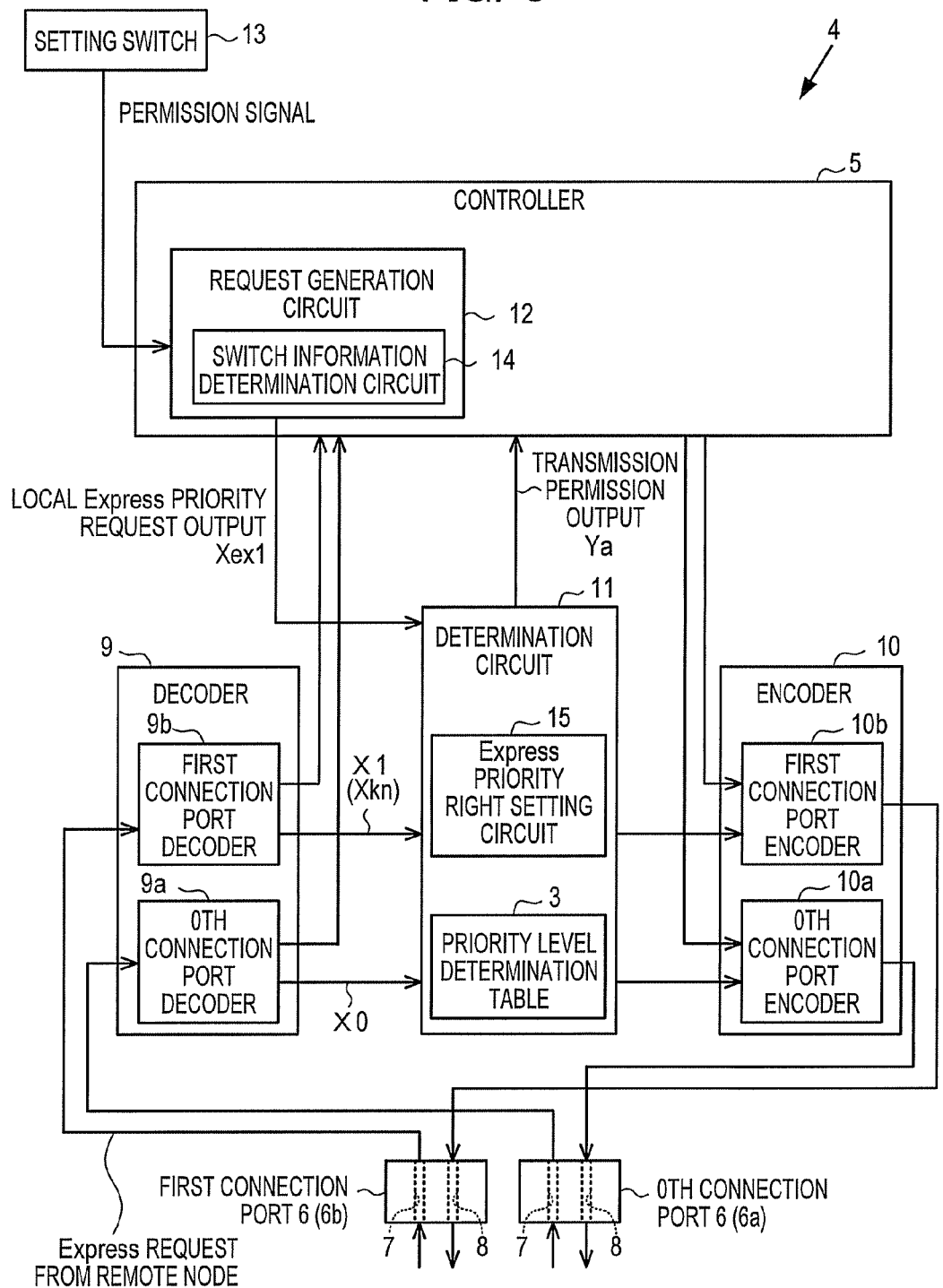
FIG. 9 illustrates an exemplary operation of a data transfer apparatus.
Figure 10:
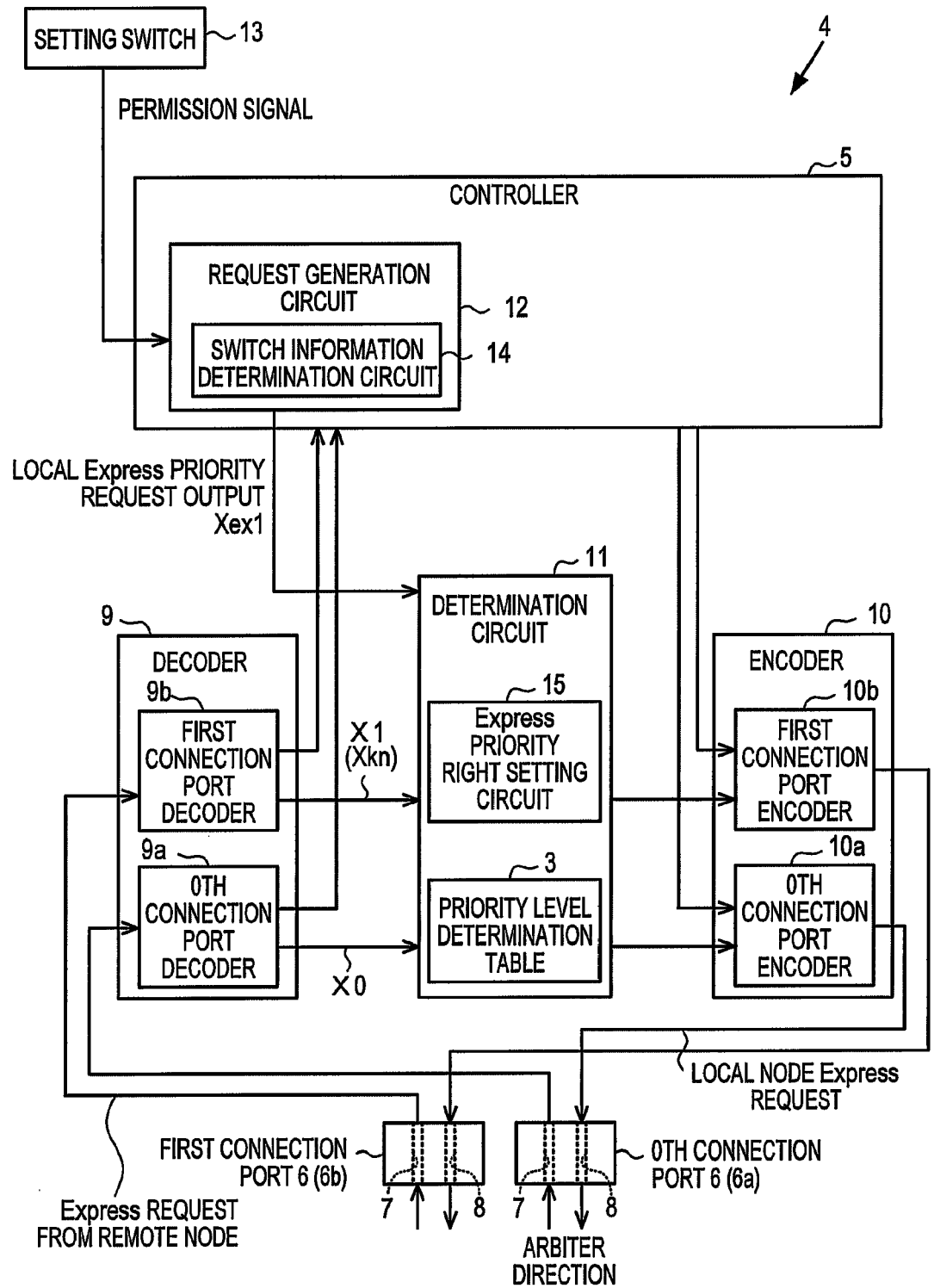
FIG. 10 illustrates an exemplary operation of a data transfer apparatus.

FIG. 9 illustrates an exemplary operation of a data transfer apparatus. FIG. 10 illustrates an exemplary operation of the data transfer apparatus. The permission signal from the setting switch 13 is input to the request generation circuit 12. Based on the permission signal from the setting switch 13, the switch information determination circuit 14 recognizes that the operation state of the local node is set to a local Express request priority state. In a given request output timing, the request generation circuit 12 outputs the local Express priority request output Xex1 including the local Express request priority instruction to the determination circuit 11.

When the determination circuit 11 receives the local Express priority request output Xex1 from the request generation circuit 12, the determination circuit 11 may contemporaneously receive an Express request command from the first connection port decoder 9b, for example, an Express request output Xkn from the remote node. For this reason, in the determination circuit 11 Express request inputs may conflict. The Express priority right setting circuit 15 operates based on the local Express request priority instruction included in the local Express priority request output Xex1, and the local node Express request such as an Express request output Xex takes priority.

For example, if the local node includes an arbiter, as illustrated in FIG. 9, the determination circuit 11 outputs a transmission permission output Ya to the controller 5 in the same node. The local node occupies the bus cable 2 to start packet communication. If the local node does not include an arbiter, as illustrated in FIG. 10, an Express request command generated by the local node request generation circuit 12 is transferred to an arbiter through the encoder 10. The Express request command passes through one or more nodes, where the priority level is confirmed, and reaches the node including an arbiter.

Figure 11:
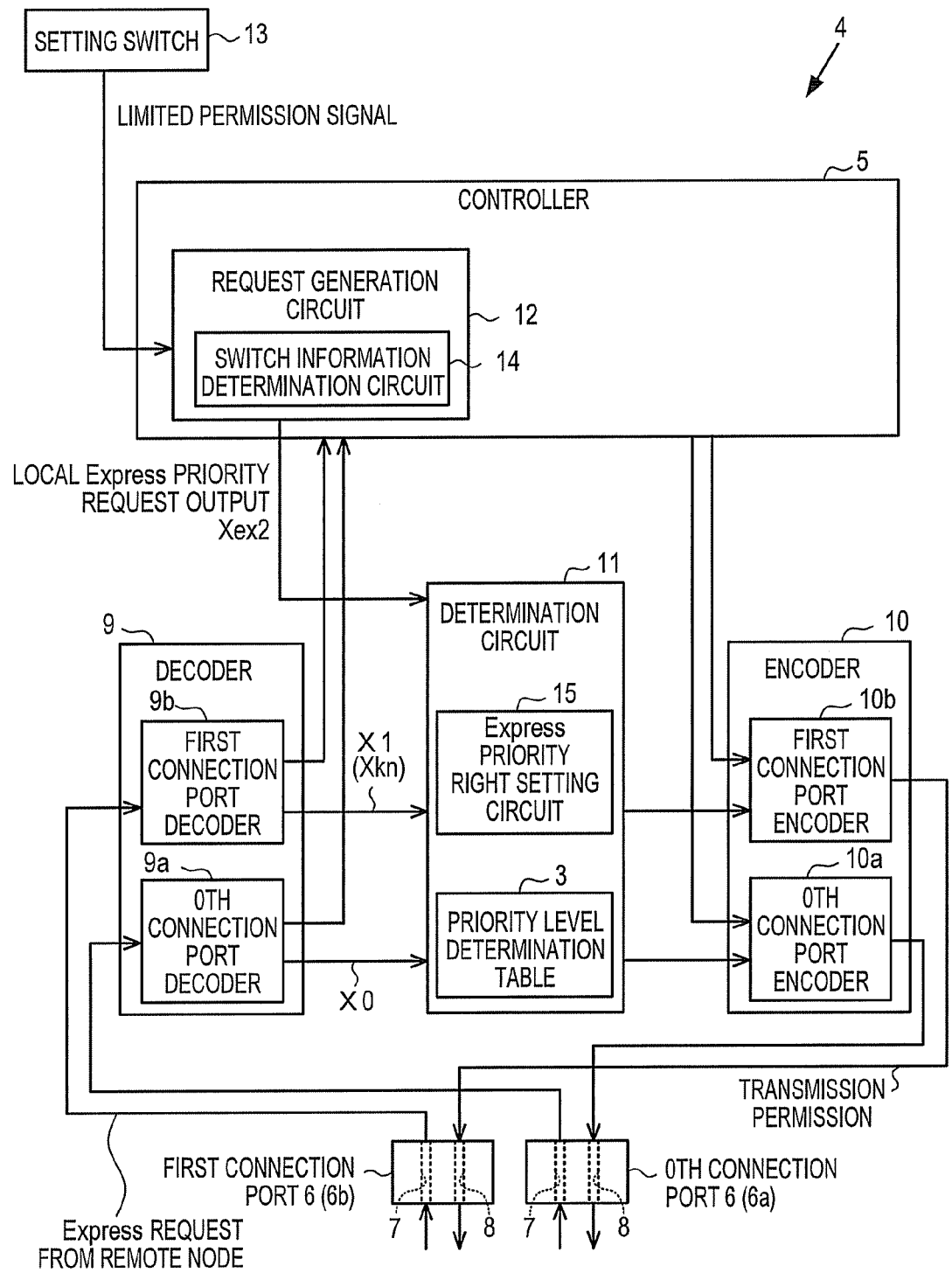
FIG. 11 illustrates an exemplary operation of a data transfer apparatus.
Figure 12:
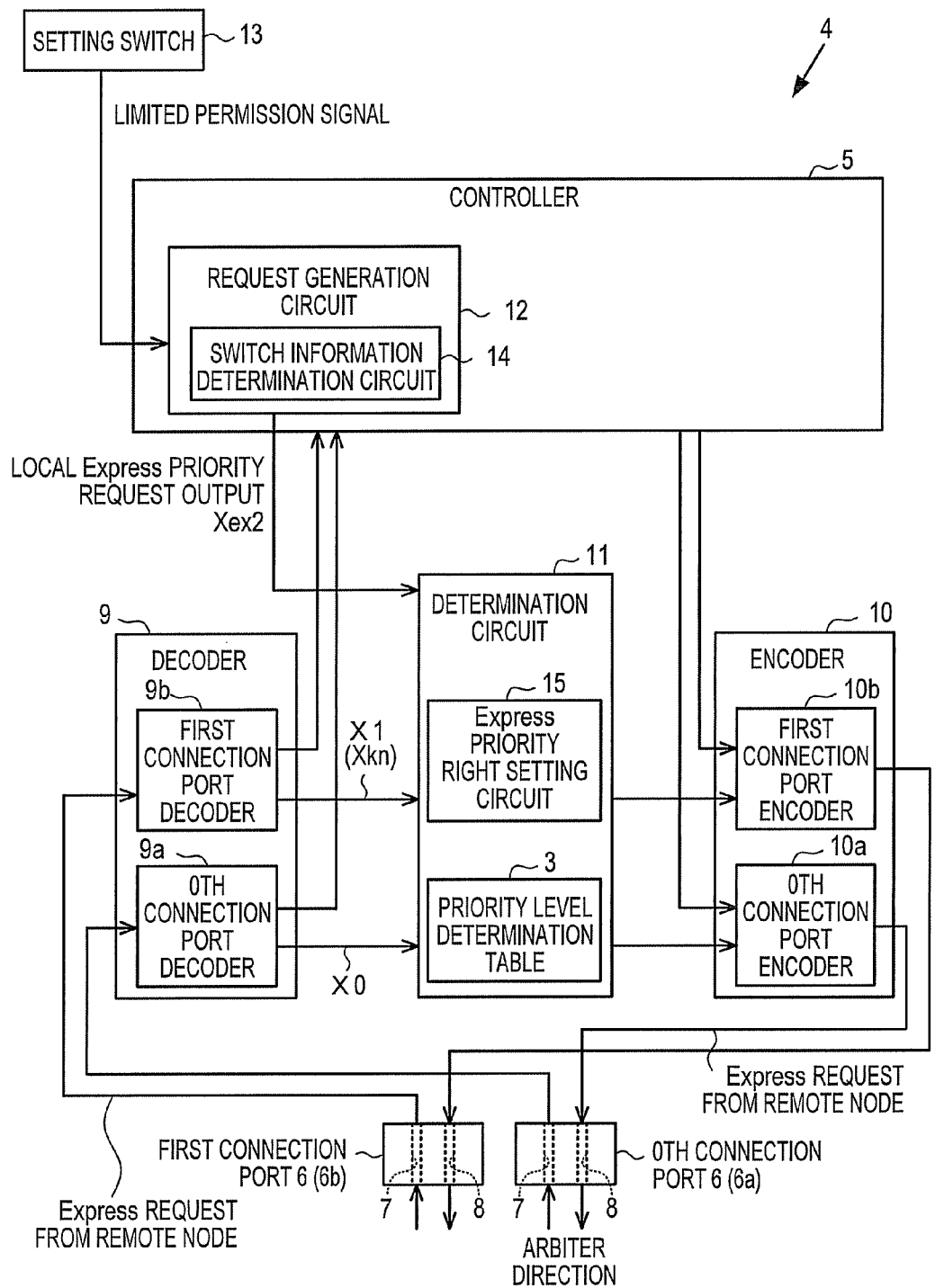
FIG. 12 illustrates an exemplary operation of a data transfer apparatus.

FIG. 11 illustrates an exemplary operation of a data transfer apparatus. FIG. 12 illustrates an exemplary operation of a data transfer apparatus. The limited permission signal from the setting switch 13 is input to the request generation circuit 12. Based on the limited permission signal from the setting switch 13, the switch information determination circuit 14 recognizes that the operation state of the local node is set to a remote Express request priority state. In a given request output timing, the request generation circuit 12 outputs the remote Express priority request output Xex2 including the remote Express request priority instruction to the determination circuit 11.

When the determination circuit 11 receives the remote Express priority request output Xex2 from the request generation circuit 12, the determination circuit 11 may contemporaneously receive an Express request command from the first connection port decoder 9b, for example, an Express request output Xkn outputted from the remote node. For this reason, in the determination circuit 11, Express request inputs may conflict. Since the Express priority right setting circuit 15 operates based on the remote Express request priority instruction included in the remote Express request priority output Xex2, a Express request of a remote node input from the first connection port 6b, such as a request output Ekn takes priority.

If the local node includes an arbiter, as illustrated in FIG. 11, the determination circuit 11 returns transmission permission to the request output source node through the encoder 10. When the node outputting the request acquires the transmission permission, the node occupies the bus cable 2 to start packet communication. If the local node does not include an arbiter, as illustrated in FIG. 12, the Express request command received from the remote node is transferred to the node including an arbiter through the encoder 10. As illustrated in FIG. 10, the Express request command passes through one or more nodes, where the priority level is confirmed, and reaches the node including an arbiter.

The request generation circuit 12 receives a prohibition signal. Based on the prohibition signal from the setting switch 13, the switch information determination circuit 14 recognizes that the operation state of the local node is set to the local Express request prohibition state. Even when an Express request command output request is received, the request generation circuit 12 does not output the Express request output Xex. An Express request command from the remote node is input to the determination circuit 11, and the Express priority right setting circuit 15 gives priority to the Express request from the remote node.

The switch information determination circuit 14 of the request generation circuit 12 monitors a signal from the setting switch 13 which determines the priority level of an Express request. The instructions based on the signal from the setting switch 13 which include output of the local Express request priority instruction and the remote Express request priority instruction, and non-output of the Express request output Xex, are output from the request generation circuit 12 to the determination circuit 11. When a plurality of Express requests conflict in the determination circuit 11, a priority level is set to each request. Even if the determination circuit 11 receives a plurality of Express requests, the priority level is determined for each request, thereby eliminating the uncertainty of communication such as that a plurality of Express requests conflict.

When a node receives an Express request from the local node and an Express request from the remote node, the setting switch 13 in the node determines which Express request takes priority. Therefore, even if a node receives a plurality of Express requests, the priority request is determined, thereby eliminating the uncertainty of communication such as that a plurality of Express requests conflict.

The priority determination is implemented by a simple part such as a switch.

If packet communication is used, the packet communication may receive advantages of high speed communication, simplified error handling, and the like.

The bus request may be transmitted, for example during data transfer, because of the duplex communication format. Stable data transfer using a low clock CPU may be performed by use of the IEEE 1394b standard.

Figure 13:
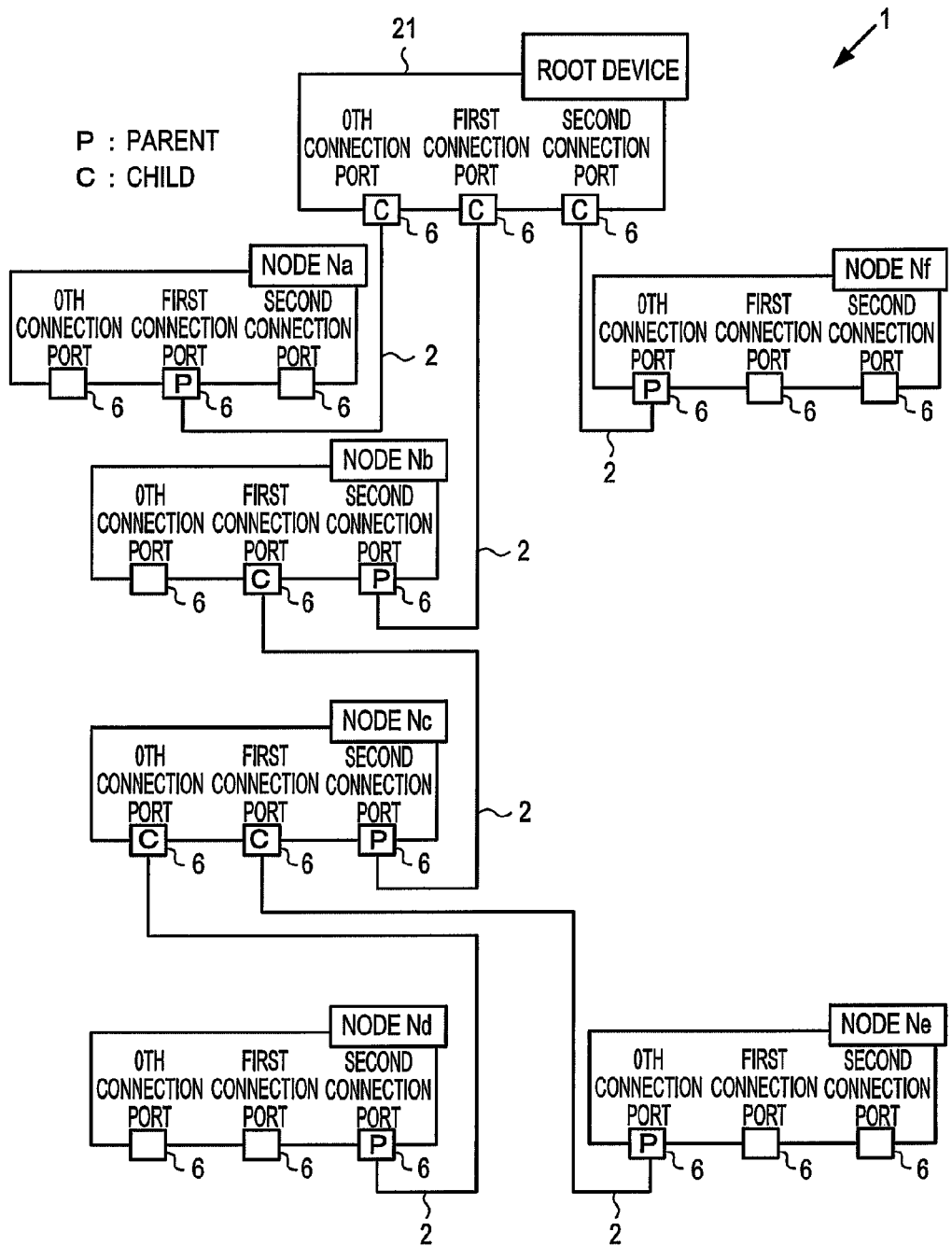
FIG. 13 illustrates a second embodiment.
Figure 14:
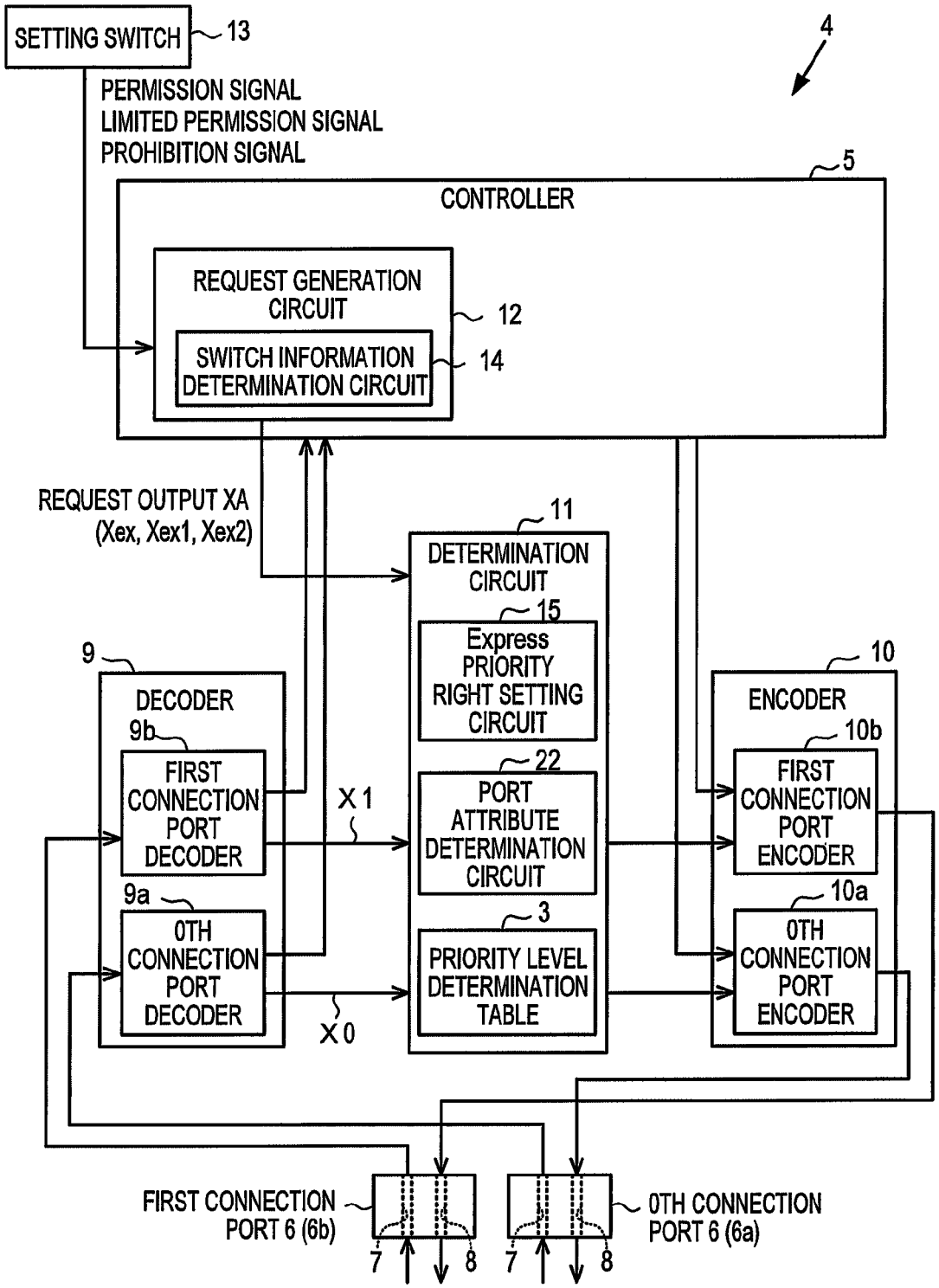
FIG. 14 illustrates an exemplary operation of a data transfer apparatus.

FIG. 13 illustrates a second embodiment. FIG. 13 illustrates an exemplary network communication system. FIG. 14 illustrates an exemplary operation of the data transfer apparatus. The same reference numerals or characters in the second embodiment are assigned to substantially the same elements as those in the first embodiment, and the description thereof is omitted or reduced.

If an Express request conflict occurs in the two connection ports 6a and 6b, priority is set to each Express request. According to the topology of the network communication system 1, any particular node views the entire network as a tree structure. A node selected is set as a root integrally managing the topology, for example, a root device. Since the IEEE 1394 standard handles any topology as a tree structure, a particular node may be automatically set as the root at network construction. When the root is determined, the port attribute of a connection port 6 of each node coupled to the root is determined according to the connection position viewed from the root. The priority level of an Express request may be determined according to the port attribute (port attribute determination method).

As illustrated in FIG. 13, the port attribute of the connection port 6 of each of the nodes Na to Nf coupled to the root device 21 is automatically given according to the network connection state. For example, the port attribute is assigned after a network is constructed and the network is automatically recognized. The port attribute of the connection port 6 of each of the nodes Na to Nf is set such that one at the side of the root device 21 is parent or higher, and one at the counter side of the root device 21 is child or lower. The port attribute of the individual connection port 6 of each of the nodes Na to Nf is automatically set such that one in the root direction is set to a parent and one in the opposite direction of root is set to a child.

As illustrated in FIG. 14, the determination circuit 11 of the data transfer apparatus 4 includes a port attribute determination circuit 22 which determines the port attribute of the individual connection port 6. When the port attribute of the individual connection port 6 of the root device 21 and each of the nodes Na to Nf is determined, the port attribute determination circuit 22 recognizes whether the individual connection port 6 is a parent or a child. When the connection port 6 receives an Express request, for example, the Express priority right setting circuit 15 uses the determination result of the port attribute determination circuit 22 to give priority to the Express request input from the connection port 6 at the parent side.

When a plurality of connection ports 6 receive a plurality of Express requests, the Express request input from a connection port 6 whose port attribute is parent is granted priority right and the corresponding connection port 6 is given transmission permission. Even if a plurality of connection ports 6 receive a plurality of Express requests, the priority level is determined for each port, thereby eliminating the uncertainty of communication such as that of a plurality of Express requests conflicts in a plurality of connection ports 6.

Since the port attribute of each of the connection ports 6 of the root device 21 is child, the priority level may not be set to a request using parent and child. For example, the priority right of the Express request may be given to a connection port whose port number is smaller. The node Nc illustrated in FIG. 13 has three connection ports 6: one is parent and the other two are child. In this case, the child connection port 6 whose port number is smaller may be given priority right.

In the topology illustrated in FIG. 13, the highest Express request priority right may be given to the root device 21. The second highest priority right may be given to the nodes Na, Nb, and Nf near the root device 21. The priority level may be set to the connection ports 6 of the root device 21 such that the smaller the port number, the higher the priority. The priority level of the nodes Na, Nb, and Nf may be: Na>Nb>Nf. According to the port attribute determination method, when a node handling important data is coupled to a side closer to the root device 21, this node is granted higher priority right than the other nodes.

When Express requests are received from a plurality of remote nodes and the Express request conflict, the request priority level is set based on the port attribute of the connection port 6 of the node. Therefore, even if a node receives a plurality of Express requests, the priority level is determined for each port, thereby eliminating the uncertainty of communication such that a plurality of Express requests conflict.

When a node handling important communication data is coupled to the network communication system 1, this node may be granted higher priority right of the Express request as long as this node is coupled to a side near the root device 21.

When a node is substantially the same connection position from the root device 21, the nodes may be given the same request priority level viewed from the root device 21. The Express request priority level of these nodes is set based on the port number of the connection destination node.

The connection port 6 of the root device 21 may be a child. The priority level may be given to the connection ports 6 of the root device 21 such that the smaller the port number, the higher the priority. The Express request priority level is set to the child connection port 6.

Figure 15:
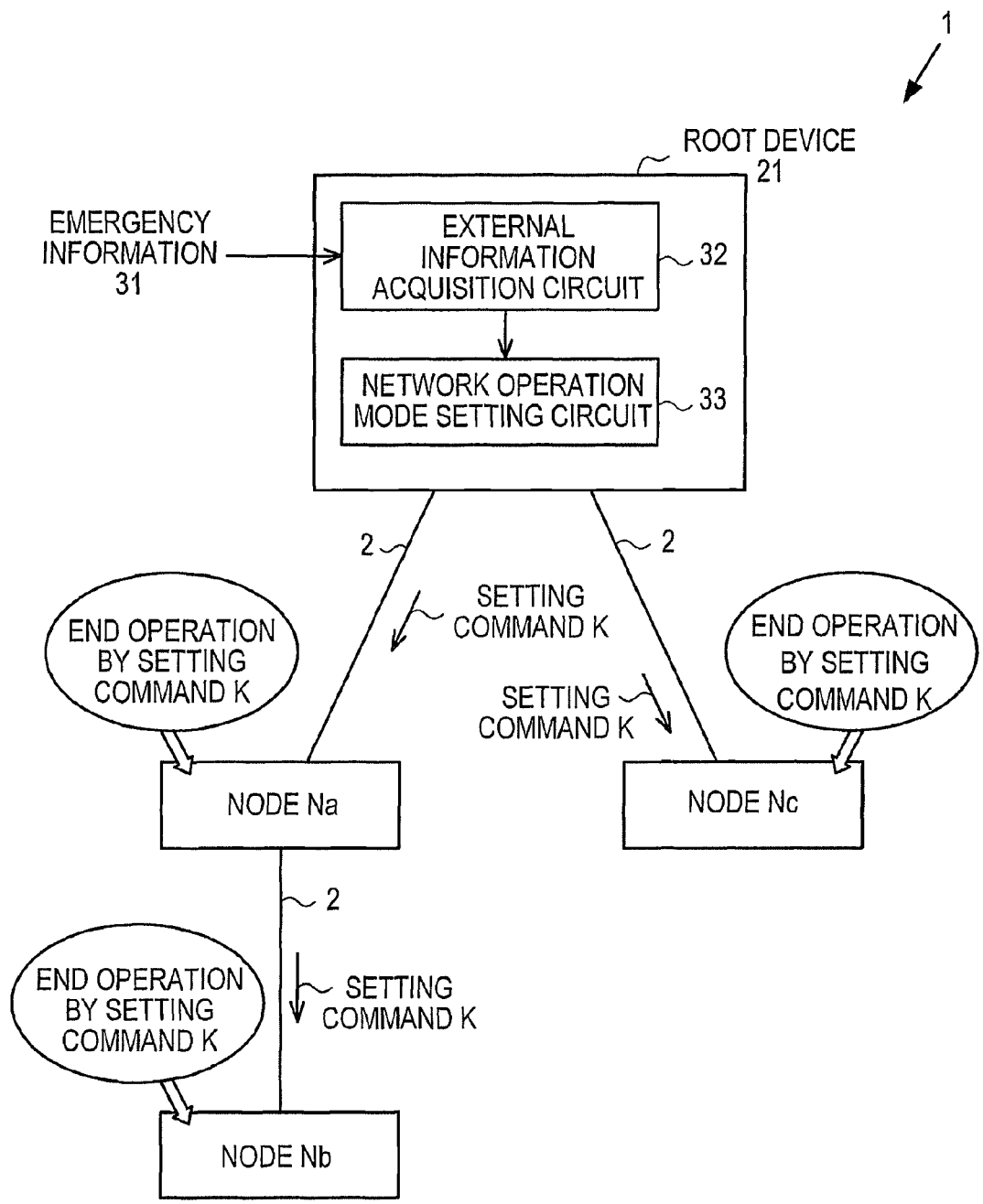
FIG. 15 illustrates a third embodiment.

FIG. 15 illustrates a third embodiment. The same reference numerals or characters in the third embodiment are assigned to substantially the same elements as those in the above described embodiments, and the description thereof is omitted or reduced.

The network communication system 1 may include nodes whose level of importance differ depending on the system type. For example, an in-vehicle local area network (LAN) system built in a vehicle may include nodes with different level of importance. In the in-vehicle LAN system, it is preferable that the nodes having a high level of importance, for example, a control device requiring high-level emergency responsiveness such as an air bag device quickly respond to data transfer. For example, the nodes of amusement devices having a low level of importance such as an audio device may have no problem allowing data transfer to be stopped.

When data transfer of a node having a low level of importance is terminated, a free space is generated in the communication area of the bus cable 2 and the data transfer band expands. Therefore, the data transfer time for the node having a high level of importance may be shorter than usual. The priority level of an Express request is set by setting the operation mode of the entire network of the network communication system 1 (network setting method). Since streaming transfer is performed on audio and video data, a wide bus band is used. Therefore, when such content transfer is terminated, a communication band is reserved.

As illustrated in FIG. 15, the root device 21 includes an external information acquisition circuit 32 which acquires emergency information 31 from outside the network communication system 1. The external information acquisition circuit 32 monitors emergency information 31, and outputs a notice based on the monitored result. For example, when the network communication system 1 is a vehicle LAN system, if the vehicle suffers a strong impact shock due to a vehicle collision accident or the like, emergency information 31 may be notified the in-vehicle LAN system.

The root device 21 includes a network operation mode setting circuit 33 which sets an operation mode of the network communication system 1 based on emergency information 31 from an external information acquisition circuit 32. When the external information acquisition circuit 32 does not acquire emergency information 31, the network operation mode setting circuit 33 sets the network operation mode to normal mode and does not limit the operation of a node in the network. When the external information acquisition circuit 32 acquires emergency information 31, the network operation mode setting circuit 33 sets the network operation mode to the Express mode and limits the operation of a node having a low level of importance.

When the external information acquisition circuit 32 acquires emergency information 31, the network operation mode setting circuit 33 outputs a setting command K to each node via the bus cable 2 by packet communication in order to switch the network operation mode from the normal mode to the Express mode. The setting command K includes a command to change the node operation state to the Express mode. For example, when a node having a high level of importance receives the setting command K, the node maintains the operation continuing state to continue or start packet communication. When a node having a low level of importance receives the setting command K, the node enters the operation stop state to refrain voluntarily from packet communication and release the bus path to a node having a high level of importance.

When not-receiving the setting command K from the root device 21, the Express priority right setting circuit 15 sets the local node to normal state. Therefore, the nodes share the bus path to perform packet communication. When receiving the setting command K from the root device 21, the Express priority right setting circuit 15 controls such that, if the local node has a high level of importance, the local node is set to the operation continuing state; and, if the local node has a low level of importance, the local node is set to the operation stop state. As a result, the nodes having a high level of importance occupy the bus path to perform packet communication.

When the root device 21 acquires emergency information 31 from outside, the root device 21 outputs a setting command K prompting the transition to the Express mode to the bus path, and the operation mode of the network communication system 1 is switched from the normal mode to the Express mode. Since the nodes having a low level of importance refrain voluntarily from communication, a large free space is generated in the bus path. Since the nodes having a high level of importance use the expanded data transfer band to perform packet communication, the data transfer time may be shortened.

A request conflict may be handled without a special request code, thereby no modification of the standard or the like is required.

The setting switch 13 may be a software switch such as register settings instead of a hardware switch.

According to the previous embodiments, the priority of an Express request is determined based on the three states permission, limited permission, and prohibition. The priority of an Express request may be determined based on the two states. The priority of an Express request may be determined based on the four or more states.

The priority level of an Express request in the root device or a node having substantially the same connection position from the root device may be determined in descending order of the port number.

The operation of a node and the limit thereof in the Express mode may be programmed, for example, customized. For example, all the transmission requests may be prohibited, and the CycleStart request may be prohibited. Pause such as power down may be set. The root device may be limited.

According to the previous embodiments, the Express mode is set based on the setting command K. The Express mode may be set based on other request, instruction, or notice. The Express mode may be set or released by packet communication and other communication.

The setting command K may be transmitted to each node individually or may be broadcast to all nodes. An individual root other than the root device 21 may set or release the Express mode based on the setting command K.

The emergency information 31 illustrated in FIG. 15 may include a plurality of kinds of information and the propagation range of the Express mode may be changed for each kind of information. A plurality of root devices 21 may provided on the network.

The network designer may perform an optimal node connection and an optimal program control based on the level of importance of the transfer data.

The embodiments are not limited to packet communication and may be applied to other communication formats. The embodiments may adopt a communication standard other than the IEEE 1394b (IEEE 1394).

According to the previous embodiments, after a packet transfer is completed, the Express request is output to cause a node interrupt, but the node interrupt may be caused by terminating a packet transfer.

Example embodiments of the present invention have now been described in accordance with the above advantages. It will be appreciated that these examples are merely illustrative of the invention. Many variations and modifications will be apparent to those skilled in the art.

The invention claimed is:

1. A data transfer apparatus performing data communication by transmitting a bus use request to an arbiter provided in a plurality of nodes coupled in a tree shape through a bus, the data transfer apparatus comprising:
   a request generation circuit which generates a highest priority request indicating that a priority level for using the bus is the highest;
   a determination circuit which, when a plurality of highest priority requests including a highest priority request issued at a node and a highest priority request issued at another node conflict, determines the priority level from among a first priority level, a second priority level and a third priority level, the first priority level indicating that the highest priority request issued at the node takes priority, the second priority level indicating that the highest priority request issued at the another node takes priority, the third priority level indicating that the issue of the highest priority request at the node is stopped; and
   a priority level setting circuit which determines the highest priority request which takes priority based on a result of the determination circuit.

2. The data transfer apparatus according to claim 1, wherein the determination circuit determines based on information indicating which request of the plurality of highest priority requests takes priority.

3. The data transfer apparatus according to claim 2, wherein, when a highest priority request from a local node and a highest priority request from a remote node conflict, the priority level setting circuit determines which node is granted a priority right based on the information.

4. The data transfer apparatus according to claim 1, wherein the determination circuit determines a port attribute of a connection port coupled to the bus, and when a plurality of highest priority requests are received from a remote node, the priority level setting circuit determines which remote node is granted a priority right based on the port attribute.

5. The data transfer apparatus according to claim 1, wherein the determination circuit determines whether or not emergency information is received from outside of the data transfer apparatus, and the priority level setting circuit outputs an operation command to a remote node based on the emergency information.

6. The data transfer apparatus according to claim 5, wherein the remote node takes a priority based on the operation command.

7. The data transfer apparatus according to claim 5, wherein the priority level setting circuit imposes an operation restriction on at least one node of the plurality of nodes based on the emergency information.

8. The data transfer apparatus according to claim 1, wherein the data communication is packet communication in which data is transferred in a packet unit.

9. The data transfer apparatus according to claim 1, wherein the data communication is stopped based on the result of the determination circuit.

10. The data transfer apparatus according to claim 1, wherein the data communication is a full-duplex communication which uses two signal lines stored in one cable.

11. A data transfer method of performing data communication by transmitting a bus use request to an arbiter provided in a plurality of nodes coupled in a tree shape through a bus, the data transfer method comprising:
    generating a highest priority request indicating that a priority level for using the bus is the highest;
    determining, when a plurality of highest priority requests including a highest priority request issued at a node and a highest priority request issued at another node conflict, the priority level from among a first priority level, a second priority level and a third priority level, the first priority level indicating that the highest priority request issued at the node takes priority, the second priority level indicating that the highest priority request issued at the another node takes priority, the third priority level indicating that the issue of the highest priority request at the node is stopped; and
    determining the highest priority request which takes priority based on a result of the determining of the priority level.

12. The data transfer method according to claim 11, further comprising determining based on information indicating which request of the plurality of highest priority requests takes priority.

13. The data transfer method according to claim 11, further comprising:
    determining which node is granted a priority right based on the information if a highest priority request from a local node and a highest priority request from a remote node conflict.

14. The data transfer method according to claim 11, further comprising:
    determining a port attribute of a connection port coupled to the bus, and determining which remote node is granted a priority right based on the port attribute when a plurality of highest priority requests are received from a remote node.

15. The data transfer method according to claim 11, further comprising:
    determining whether or not emergency information is received from outside of the data transfer apparatus, and outputting an operation command to a remote node based on the emergency information.

* * * * *